US008100087B2

(12) United States Patent
Fredricks

(10) Patent No.: US 8,100,087 B2
(45) Date of Patent: Jan. 24, 2012

(54) AQUARIUM LIGHT FIXTURE WITH HINGE

(75) Inventor: Dennis Fredricks, Escondido, CA (US)

(73) Assignee: Cogent Designs, Inc., Escondido, CA (US)

( * ) Notice: Subject to any disclaimer, the term of this patent is extended or adjusted under 35 U.S.C. 154(b) by 0 days.

(21) Appl. No.: 12/760,398

(22) Filed: Apr. 14, 2010

(65) Prior Publication Data

US 2011/0253057 A1 Oct. 20, 2011

(51) Int. Cl.
*A01K 63/06* (2006.01)
(52) U.S. Cl. ........................ 119/266; 119/267
(58) Field of Classification Search .......... 119/233, 119/245, 265, 266, 267, 248, 257, 269
See application file for complete search history.

(56) References Cited

U.S. PATENT DOCUMENTS

| | | | |
|---|---|---|---|
| 2,988,312 A | 6/1961 | Dumas | |
| 3,828,176 A | 8/1974 | Goldman et al. | |
| 3,834,351 A * | 9/1974 | Schmidt | 119/266 |
| 3,841,267 A * | 10/1974 | Miller | 119/266 |
| 3,857,366 A * | 12/1974 | Willinger | 119/266 |
| 4,994,943 A | 2/1991 | Aspenwall | |
| 5,089,940 A | 2/1992 | Lanzarone et al. | |
| 5,165,778 A | 11/1992 | Matthias et al. | |
| 5,211,469 A | 5/1993 | Matthias et al. | |
| 5,649,757 A * | 7/1997 | Aleman et al. | 362/101 |
| 5,848,837 A | 12/1998 | Gustafson | |
| 5,921,203 A * | 7/1999 | Gibbs | 119/248 |
| 5,927,845 A | 7/1999 | Gustafson et al. | |
| 6,041,739 A * | 3/2000 | Caradant | 119/247 |
| 6,065,849 A | 5/2000 | Chen | |
| 6,166,496 A | 12/2000 | Lys et al. | |
| 6,184,628 B1 | 2/2001 | Ruthenberg | |
| 6,577,080 B2 | 6/2003 | Lys et al. | |
| 6,673,292 B1 | 1/2004 | Gustafson et al. | |
| 6,781,329 B2 | 8/2004 | Mueller et al. | |
| 6,866,006 B1 * | 3/2005 | Annis | 119/245 |
| 6,921,182 B2 | 7/2005 | Anderson, Jr. et al. | |
| 6,967,448 B2 | 11/2005 | Morgan et al. | |
| 7,044,081 B1 * | 5/2006 | Bridges | 119/246 |
| 7,168,862 B2 | 1/2007 | Qi et al. | |
| 7,187,141 B2 | 3/2007 | Mueller et al. | |
| 7,220,018 B2 | 5/2007 | Crabb et al. | |

(Continued)

FOREIGN PATENT DOCUMENTS

DE 4218880 7/1993

(Continued)

*Primary Examiner* — Rob Swiatek
*Assistant Examiner* — Lisa Tsang
(74) *Attorney, Agent, or Firm* — Sheppard, Mullin, Richter & Hampton LLP; David E. Heisey

(57) ABSTRACT

Various embodiments of the present invention provide a lighting apparatus that may be utilized with aquariums having features and functionality enabling a person to easily access the opening of an aquarium for various purposes, such as cleaning and maintenance. According to one embodiment of the invention, the lighting apparatus comprises two or more panels; one or more joints that join at least two adjacent panels together; and one or more light elements disposed on the aquarium lighting apparatus such that at least one lighting element illuminates a side common to all of the panels. For some embodiments, features of the present invention allow the lighting apparatus to illuminate the aquarium, while limiting the evaporation of water from the aquarium.

13 Claims, 3 Drawing Sheets

U.S. PATENT DOCUMENTS

| | | | |
|---|---|---|---|
| 7,221,104 B2 | 5/2007 | Lys et al. |
| 7,258,459 B2 | 8/2007 | Wang |
| 7,427,840 B2 | 9/2008 | Morgan et al. |
| 7,453,217 B2 | 11/2008 | Lys et al. |
| 7,473,008 B2 | 1/2009 | Crabb et al. |
| 7,482,764 B2 | 1/2009 | Morgan et al. |

FOREIGN PATENT DOCUMENTS

| | | |
|---|---|---|
| GB | 2266043 | 10/1993 |
| WO | WO 2007129307 A2 * | 11/2007 |

* cited by examiner

US 8,100,087 B2

AQUARIUM LIGHT FIXTURE WITH HINGE

FIELD OF THE INVENTION

The present invention relates to lighting apparatus and, more particularly, some embodiments are directed toward lighting apparatus used in conjunction with aquariums.

DESCRIPTION OF THE RELATED ART

Conventional aquarium light fixtures are generally composed of a shaded lamp affixed above the opening of an aquarium. In order to attach the fixture to the aquarium, typical methods include placing the fixture over the aquarium whereby the entire aquarium opening is covered, and using rods/legs that extend out from the fixture and attach to the top of the sidewalls of the aquarium. These rods/legs elevate the light fixture above the aquarium opening and allow the rod/legs to clamp onto the aquarium. Yet other methods of attachment include custom ordered aquarium light fixtures that are made to order based on the specific size of the aquarium's opening.

However, these light fixtures with conventional attachment methods lead to reduced access to the aquarium opening. Light fixtures such as these usually require removal of some or all of the light fixture before the aquarium can be accessed for service or cleaning. In addition, light fixtures that use attachment methods involving rods/legs may result in damage to the aquarium, or encounter problems fitting the aquarium due to the incompatibility of the fixture with the aquarium.

BRIEF SUMMARY OF EMBODIMENTS OF THE INVENTION

Various embodiments of the present invention provide a lighting apparatus that may be utilized with aquariums. The features and functionality of some of these embodiments enable a person to easily access the opening of an aquarium for various purposes, such as cleaning and maintenance. Additionally, for some embodiments, features of the present invention allow the lighting apparatus to illuminate the aquarium, while limiting the evaporation of water from the aquarium. Though the present invention is described within the context of aquariums, it will be appreciated by those of ordinary skill in the art that various embodiments of the present invention may also be utilized in applications other than aquariums, such as in the field of horticulture.

According to one embodiment of the invention, the lighting apparatus provided comprises two or more panels; one or more joints that join at least two of the panels together; and one or more light elements disposed on the aquarium lighting apparatus such that at least one lighting element illuminates a side common to all of the panels. For some embodiments, the lighting apparatus is configured to be placed over an opening (e.g., an aquarium opening) such that the apparatus provides illumination for the aquarium while providing closure for the opening. Further, the light apparatus may be configured to allow at least one of its panels to be (1) lifted from a closed position to an open position, thereby allowing access through the opening, and (2) lowered from an open position to a closed position, thereby closing access through the opening.

Additionally, for various embodiments, at least one of the joints may be configured with a resilient element that assists in pivoting an attached panel about the joint. In doing so, the resilient element assists in the lifting and lowering of the panels in accordance with the invention. In further embodiments, at least one of the joints joins one of the panels to an aquarium. Such embodiments allow the entire lighting apparatus to be lifted and displaced with respect to the aquarium opening, as opposed to just specific panels.

In other embodiments, at least one of the joints utilized is a hinged joint, while in other embodiments at least one of the joints utilized is a plastic joint. Optionally, in some embodiments, at least one the joints is removable from at least one of the panels, thereby allowing one to remove, repair or replace either the panels or the joints.

In other embodiments, the panels are configured to be substantially flat on at least one side common to all the panels. In further embodiments, the panels are sufficiently flat on at least one side common to all the panels such that the panels sit substantially flush with an opening (e.g., aquarium opening). In doing so, such embodiments can limit the amount water that evaporates from the aquarium over a given period.

In various embodiments, at least one of the light elements is disposed on at least one of the joints. For example, the light elements may comprise a strip of light elements disposed on one of the joints. In other embodiments, at least one of the light elements is disposed on at least one of the panels. For example, the light elements may be embedded within at least one of the panels.

Depending on the embodiment, the light elements utilized may include light emitting diodes (LEDs), organic light emitting diodes (OLEDs), xenon bulbs, halogen bulbs, and electroluminescent (EL) light source (e.g., an EL panel or film). In certain settings (e.g., aquarium), these light elements may optionally be covered by a water resistant coating or covering that protects the light elements exposure to moisture. Other embodiments may utilize panels comprising two or more sub-panels and at least one of the light elements, wherein the light element is laminated in between at least two of the sub-panels. Also, depending on the embodiment at least one of the panels may be constructed of glass, aluminum, or plastic.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward lighting apparatuses comprising two or more panels; one or more joints that join at least two of the panels together; and one or more light elements disposed on the aquarium lighting apparatus such that at least one lighting element illuminates a side common to all of the panels. According to some embodiments, features of the present invention allow the lighting apparatus to illuminate the aquarium and allow easy access to the opening of an aquarium, while limiting the evaporation of water from the aquarium.

Figure 1A:
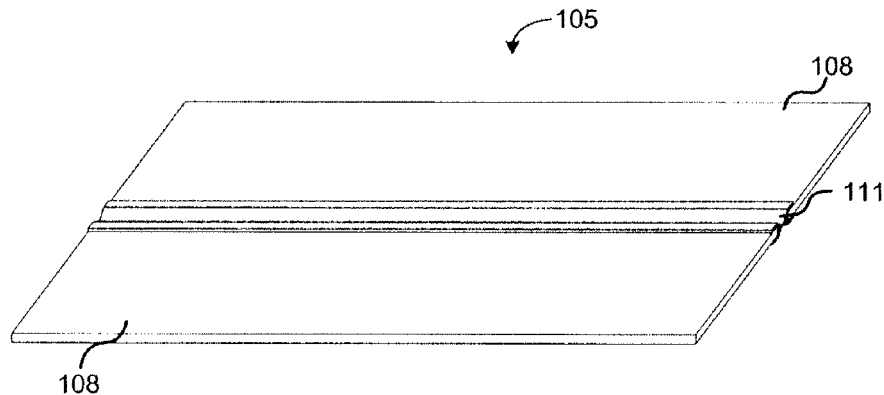
FIG. 1A is a perspective view of an example lighting apparatus in accordance with one embodiment of the invention.
Figure 1B:
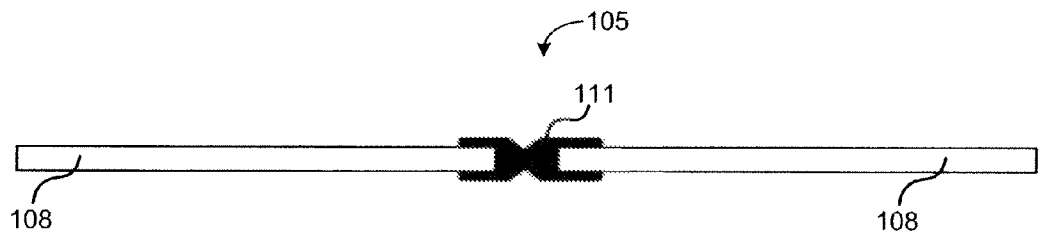
FIG. 1B is a side view of the example lighting apparatus of FIG. 1A in the closed position in accordance with one embodiment of the invention.
Figure 1C:
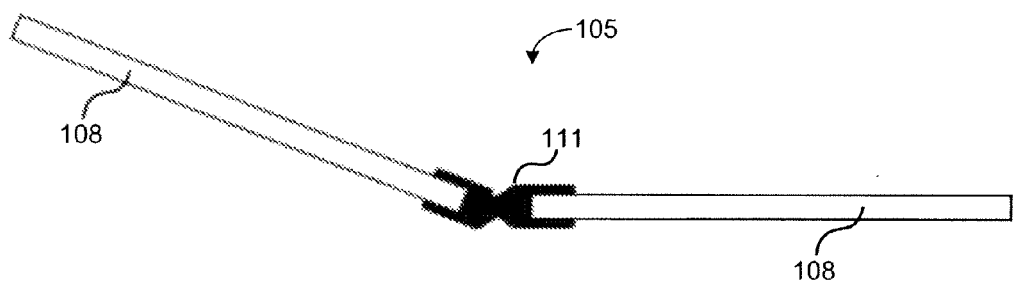
FIG. 1C is a side view of the example lighting apparatus of FIG. 1A in the open position in accordance with one embodiment of the invention.

FIG. 1A is a perspective view of one example lighting apparatus 105 in accordance with one aspect of the invention. As illustrated, lighting apparatus 105 comprises two panels 108 separated by a plastic hinge 111 that facilitates the movement of one of the panels 108 from the closed position (FIG. 1B) to an open position (FIG. 1C), and vice versa. In addition, panels 108 as depicted are substantially flat, thereby allowing apparatus 105 to sit flush with respect the opening when the panels 108 are in closed position. The panels 108 may be constructed from a variety of materials including, but not limited to, glass, plastic, and metal.

Optionally, in some embodiments, a variety of joint types can be utilized in place of or in addition to plastic hinge 111. For example, in place of plastic hinge 111, a series of metal joints may be utilized to join panels 108 together and facilitate the opening/closing movement of the panels. In further embodiments, the joint may be removable from the panels such that either the panels, the joints, or both can be repaired or replaced. Additionally, some embodiments may have a joint that is configured with a resilient element (e.g., spring) such that the resilient element assists in pivoting an attached panel about the joint. In doing so, the resilient element assists in displacing a panel from the closed position to the open position, and vice versa.

Figure 2A:
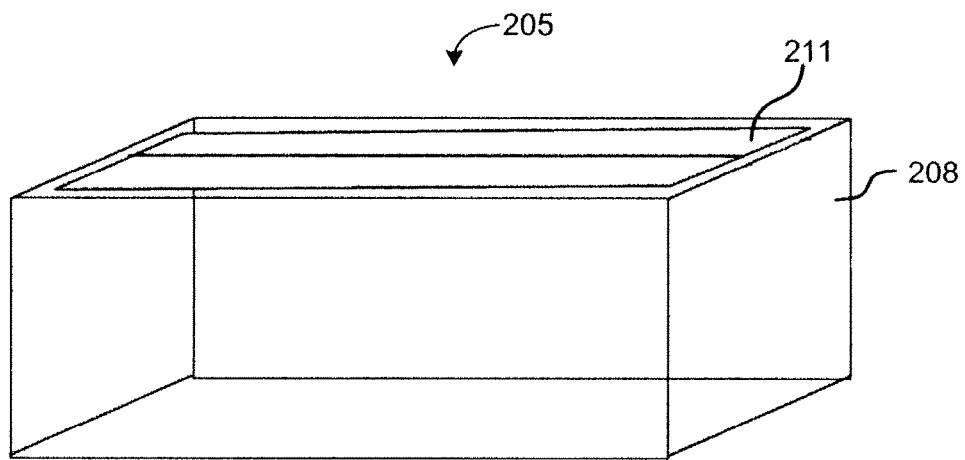
FIG. 2A is a perspective view of an example lighting apparatus in the closed position in accordance with one embodiment of the invention, used in conjunction with an example aquarium.
Figure 2B:
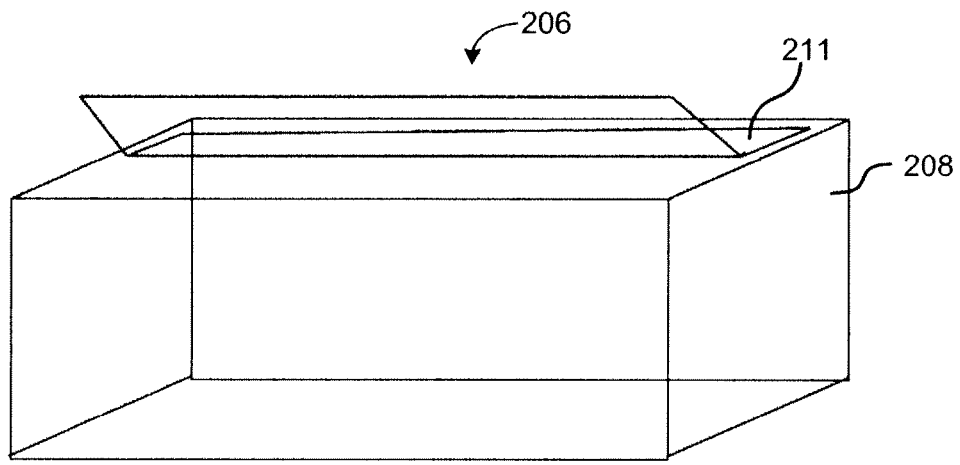
FIG. 2B is a perspective view of the example lighting apparatus of FIG. 2A in the open position in accordance with one embodiment of the invention, used in conjunction with an example aquarium.

In order to better illustrate the use of an embodiment in the open position and closed position, FIGS. 2A and 2B provides an example lighting apparatus 211 in use with an example aquarium 208. Turning now to FIG. 2A, configuration 205 illustrates a lighting apparatus 211 in the closed position used in conjunction with an aquarium 208. Specifically, lighting apparatus 211 is configured over an opening of aquarium 208 such that lighting apparatus 211, which is depicted in the closed position, restricts access to the opening. As a result, apparatus 211 not only prevents objects from inadvertently falling into the aquarium 208, but also limits the amount of water evaporation that occurs from the aquarium 208. Referring now to FIG. 2B, configuration 206 illustrates the lighting apparatus 211 in the open position. As illustrated, apparatus 211 in the open position allows access through the opening of aquarium 208.

Figure 3:
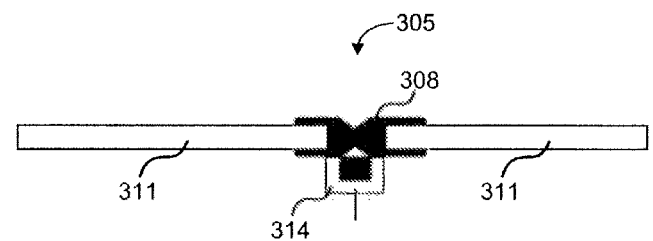
FIG. 3 is a side view of an example lighting apparatus with a light element disposed on the joint in accordance with one embodiment of the invention.

FIG. 3 is a side view of an example lighting apparatus 305 in accordance with one embodiment of the invention. Similar to lighting apparatus 105, apparatus 305 comprises a plastic hinge 308 that joins panels 311 and facilitates their open/close movement. However, unlike apparatus 105, plastic hinge 308 is additionally configured with a light element 314, which provides illumination through the opening the apparatus covers. By way of example, the light element may comprise, without limitation, a light emitting diode (LED), an organic light emitting diode (OLED), a xenon bulb, a halogen bulb, or an electroluminescent light (EL) source (e.g., EL panel or film). Additionally, light element 314 may be configured with a covering that protects it from both inadvertent physical contact and moisture (e.g., water from the aquarium, condensation).

Figure 4A:
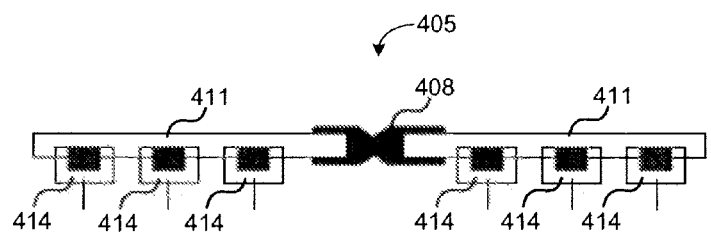
FIG. 4A is a side view of an example lighting apparatus with light elements disposed on the panels in accordance with one embodiment of the invention.
Figure 4B:
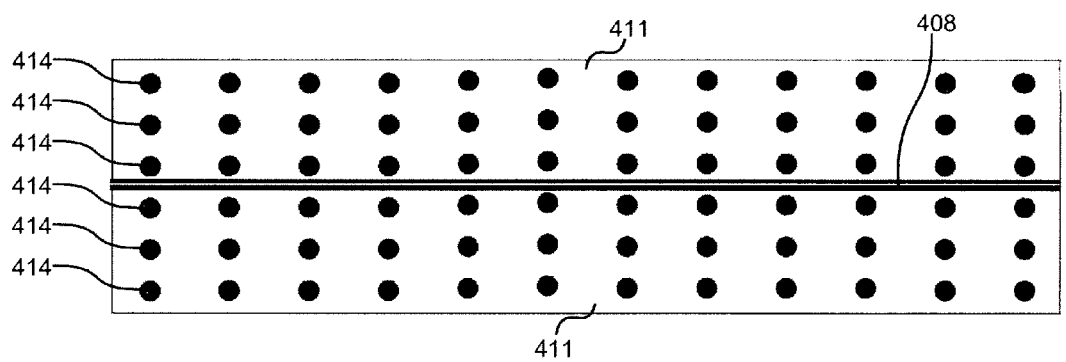
FIG. 4B is a bottom view of the example lighting apparatus of FIG. 4A with an array of light elements disposed on the panels in accordance with one embodiment of the invention.

As shown, a single light element 314 is disposed on plastic hinge 308 such that light element 314 illuminates a side common to panels 311. In the alternative, FIG. 4A depicts an example lighting apparatus 405 with a plurality of lighting elements 414 disposed on panels 411. Similar to lighting apparatus 305, apparatus 405 also comprises a plastic hinge 408, panels 411, and light elements 414, which illuminate a side common to panels 411. Although light elements 414 as depicted are disposed on panels 414, in other embodiments, light elements 414 may be partially or fully embedded into panels 411. Furthermore, light elements 414 may be laminated in between sub-panels that form panels 411. Referring now to FIG. 4B, a bottom view of lighting apparatus 405 is provided illustrating how light elements 414 may be arranged upon panels 411.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An aquarium lighting apparatus, comprising:
   two or more panels, wherein the panels are substantially flat;
   one or more joints, wherein at least one of the joints joins two adjacent panels together; and
   one or more light elements disposed on the aquarium lighting apparatus such that at least one light element is attached directly to a bottom, aquarium-facing surface of a joint such that it illuminates a side common to all of the panels.

2. The aquarium lighting apparatus of claim 1, wherein the panels are sufficiently flat on at least one side common to all the panels such that the panels sit substantially flush with an opening of an aquarium.

3. The aquarium lighting apparatus of claim 1, wherein at least one light element is disposed on at least one of the joints.

4. The aquarium lighting apparatus of claim 1, wherein each light element comprises a strip of light elements disposed on at least one of the joints.

5. The aquarium lighting apparatus of claim 1, wherein at least one light element is disposed on at least one of the panels.

6. The aquarium lighting apparatus of claim 1, wherein at least one light element is embedded within at least one of the panels.

7. The aquarium lighting apparatus of claim 1, wherein each light element is a member selected from the group consisting of a light emitting diode, an organic light emitting diode, a xenon bulb, a halogen bulb, and an electroluminescent light source.

8. The aquarium lighting apparatus of claim 1, wherein at least one of the joints joins one of the panels to an aquarium.

9. The aquarium lighting apparatus of claim 1, wherein at least one of the panels is constructed of glass, aluminum or plastic.

10. The aquarium lighting apparatus of claim 1, wherein at least one of the joints is configured with a resilient element that assists in pivoting an attached panel about the joint.

11. The aquarium lighting apparatus of claim 1, wherein at least one of the joints is a hinged joint.

12. The aquarium lighting apparatus of claim 1, wherein at least one of the joints is a plastic joint.

13. The aquarium lighting apparatus of claim 1, wherein at least one of the joints is removable from at least one of the panels.

* * * * *